(12) United States Patent
Cheng (10) Patent No.: US 7,419,083 B1
(45) Date of Patent: Sep. 2, 2008

(54) METHOD FOR METAL ORNAMENTATION

(76) Inventor: Angela Cheng, 141-45 Union Turnpike, Flushing, NY (US) 11367

( * ) Notice: Subject to any disclaimer, the term of this patent is extended or adjusted under 35 U.S.C. 154(b) by 413 days.

(21) Appl. No.: 11/111,777

(22) Filed: Apr. 22, 2005

Related U.S. Application Data (60) Provisional application No. 60/564,221, filed on Apr. 22, 2004.

(51) Int. Cl.
| B23K 31/02 | (2006.01) |
| B23K 35/12 | (2006.01) |
| B29C 65/00 | (2006.01) |
| B32B 37/00 | (2006.01) |
| B32B 38/00 | (2006.01) |
| B44D 2/00 | (2006.01) |

(52) U.S. Cl. .................. 228/122.1; 228/245; 156/62

(58) Field of Classification Search .............. 228/248.1, 228/122.1, 245–246, 253–254; 63/26
See application file for complete search history.

(56) References Cited

U.S. PATENT DOCUMENTS

| 1,238,721 | A | 8/1917 | Birnbaum et al. |
| 1,737,333 | A | 11/1929 | Rivelis |
| 2,080,317 | A | 5/1937 | Jaeckel |
| 2,140,396 | A | 12/1938 | Whitaker |
| 2,600,319 | A | 6/1952 | Postel |
| 2,747,259 | A | 5/1956 | Brioux |
| 3,762,883 | A | 10/1973 | Shepard et al. |
| 4,105,812 | A | 8/1978 | Campbell, Jr. |
| 4,392,289 | A | 7/1983 | Michaud |
| 4,738,240 | A | 4/1988 | Aich |
| 5,003,678 | A | 4/1991 | Oganesyan |
| 5,099,660 | A | 3/1992 | Dostourian |
| D335,471 | S | 5/1993 | Coleman |
| D386,443 | S | 11/1997 | Itzkowitz |
| 5,690,477 | A | 11/1997 | Haimoff |
| D387,300 | S | 12/1997 | Morrison |
| D390,151 | S | 2/1998 | Blum et al. |
| D401,884 | S | 12/1998 | Gruosi |
| 5,881,795 | A | 3/1999 | Uptain |
| D409,518 | S | 5/1999 | Ho |
| D430,061 | S | 8/2000 | Chan |
| 6,146,723 | A | 11/2000 | Arends |
| D434,995 | S | 12/2000 | Harkness |
| D440,179 | S | 4/2001 | Morelle |
| D447,716 | S | 9/2001 | Itzknowitz |
| D462,289 | S | 9/2002 | Wolf |

(Continued)

FOREIGN PATENT DOCUMENTS

EP 201394 4/1988

Primary Examiner—Jerry Lorengo
Assistant Examiner—Megha Mehta
(74) Attorney, Agent, or Firm—Richard C. Litman (57) ABSTRACT

A method for metal ornamentation, particularly for making granulated metal ornaments, is used to arrange single and single line granulated arrangements or patterns and to set gemstones within a workpiece. The method places preformed spherical granules in seats defined on a surface of the workpiece. The seats permit the granules to stay in position on the workpiece and allow adhesive to cover more contact surface area between the granules and the workpiece. Since the amount of fusion will increase due to the increased contact area, the granules are strong enough to be used to set gemstones. In addition, this method facilitates using small round stones in lieu of metal granules to form unique granulated patterns.

4 Claims, 14 Drawing Sheets

U.S. PATENT DOCUMENTS

| | | |
|---|---|---|
| 6,591,633 B2 | 7/2003 | Pachauer |
| 6,594,901 B2 | 7/2003 | David |
| D483,687 S | 12/2003 | Chan |
| D485,509 S | 1/2004 | Shagalov |
| 2002/0112505 A1 | 8/2002 | Camhi |
| 2003/0046955 A1 | 3/2003 | Elishyov |
| 2003/0177753 A1 | 9/2003 | Seliktar |
| 2003/0177788 A1 | 9/2003 | Seliktar |
| 2003/0221452 A1 | 12/2003 | Morbidoni |
| 2003/0226374 A1 | 12/2003 | Seliktar |

METHOD FOR METAL ORNAMENTATION

CROSS-REFERENCE TO RELATED APPLICATION

This application claims the benefit of U.S. Provisional Patent Application Ser. No. 60/564,221, filed Apr. 22, 2004.

BACKGROUND OF THE INVENTION

1. Field of the Invention

The present invention relates to granulated ornamentation on a workpiece, more particularly to a method of granule arranging in the granulation process. The invention also relates to a method of creating stone mountings on the granulated workpiece. The method permits using small round stones as another component beside metal granules in composing the granulated pattern.

2. Description of the Related Art

Granulation is a metalwork process wherein small granules or round spheres of metal are joined to a metal base by fusion welding. In true granulation, a granule retains its complete spherical form, and only a minimally visible joining fillet exists. Some visible fillets must exist in order for the bond to be strong enough to function.

Granules in granulated jewelry can be disposed on base metal in any number and form by applying an organic glue solution. After the glue has dried, heat is applied, and fusion occurs at each contact point or surface between granule and granule, and between granule and base surface. There are basic granule arrangement and growth pattern systems commonly used by granulation artists. The easiest patterns to be arranged are those geometrical shapes formed by interlocking granules.

Because of liquid surface tension, when a group of granules remain in a wetted surrounding, they tend to automatically interlock with each other, thereby requiring half as much effort when arranging these interlocking granule patterns. These patterns remain securely in position on the base surface throughout the process of granule arranging because of stronger bonding strength created by the increased number of contact points for each granule when granules interlock.

While the surrounding is wet again at the stage of fusing (due to the liquefied joint at each contact point), interlocking granule patterns still stay on the base surface securely. Non-interlocking singles and single lines of granules are difficult to be arranged on the base surface, and they often fall off or shift during the process of fusing. Because of the fact that round spheres roll and tend to attract each other, granulation artists have to fight the attractive forces from each granule in order to form them in singles and single lines, and because there are not enough contact points for each granule in single and single lines of granules to create enough binding strength, once the patterns are formed, artists still worry that single and single lines of granules might be dislocated while the joints liquefied at the stage of fusing.

Because of all these difficulties, most artists avoid using single and single line granulated patterns in their designs unless there are supportive structures created next to the singles and single lines of the granules. This is why traditional granulation has very limited ornamental surface design. A few artists try to do it by gluing each granule after the previous one is dry, which is very time-consuming. Some artists use a scriber to scribe lines on the base surface prior to arranging granules, but lines made by the scriber are only deep enough for very small granules.

There exists a need for a method of securing granules of various sizes on a base surface when arranging singles and single lines of granules for various patterns.

U.S. Pat. No. 6,594,901, issued to David on Jul. 22, 2003, discloses a metal ornamentation method. The method includes the steps of obtaining an object having a metal surface, making a pattern on the surface, creating holes or negative space on the metal surface and filling the holes or negative spaces with a second metal by melting or hammering the metal in. Once the second metal is inserted into the holes or negative space a beading tool must be used to shape the second metal into beads, domes or other shapes.

U.S. Pat. No. 2,747,259, issued to Brioux on May 29, 1956, describes a method of forming a ring having metal inserts embedded within the ring. The method comprises drilling a hole in a ring blank, displacing the metal by a punch tool, and placing a metal insert in the deformed hole having the same configuration as the punch tool. The metal insert used should have the same hardness as the blank metal. U.S. Pat. No. 2,140,396, issued to Whitaker on Dec. 13, 1938, discloses a method for pressing an ornamented metal onto another metal, such as a ring, brooch or other metal.

Some methods of making jewelry involve embedding a gemstone into a metal where the gemstone is supported by creating a seat in the metal or by cutting notches into the gem so that it can be supported by the metal. U.S. Pat. No. 4,392,289, issued to Michaud on Jul. 12, 1983, discloses a method of setting gems in precious metal using a lost wax process. The method uses a gemstone seat having undercut grooves disposed in sidewalls of the seat to hold and set the gemstone. The method requires the gemstone to be snapped into a wax model prior to conducting investment casting. U.S. Pat. No. 5,881,795, issued to Uptain on Mar. 16, 1999, describes a method for making jewelry by casting metal around a gem. This method precludes the need for making seats, undercuts and using wax.

U.S. Pat. No. 5,003,678, issued to Oganesyan on Apr. 2, 1991, discloses a method of making a channel set ring. The method uses a machine with different attachments to create a groove and depressions on the bottom of the groove to hold diamonds. Wax is disposed within the groove to hold the diamond as the rim of the groove is pushed inward over the diamond to hold the diamond in place. The wax is removed by melting to produce the final product.

U.S. Pat. No. 5,690,477, issued to Haimoff on Nov. 25, 1997, discloses a method for invisibly setting jewelry. The method requires grooves be cut into the gem just under the girdle to provide support and hold the gem in place in an article of metal jewelry. The lost-wax method is used to set the jewelry. U.S. Pat. No. 4,738,240, issued to Aich on Apr. 19, 1988, and European Patent Number 201,394, published on Apr. 19, 1988, disclose a process for cutting dihedron notches below the girdle of a diamond to provide an invisible mounting.

Some methods have been developed for texturing metals to impart a decorative effect on a surface of the metal. U.S. Pat. No. 4,105,812, issued to Campbell, Jr. on Aug. 8, 1978, describes a decorative surface finish for ferrous metals. U.S. Patent Publication Number 2003/0177788, and U.S. Patent Publication Number 2003/0177753, both published on Sep. 25, 2003, and U.S. Patent Publication Number 2003/0226374, published on Dec. 11, 2003, disclose a decorative, textured jewelry surface. The surface is created by a method used to form patterns of intersecting grooves that reflect light.

Jewelry having removable or interchangeable gemstones are disclosed in U.S. Patent Publication Number 2003/0221452, published on Dec. 4, 2003 (a jewel holding an interchangeable gemstone) and U.S. Pat. No. 2,600,319, issued to Postel on Jun. 10, 1952 (removable jewel earring).

The art of jewelry design has produced a plethora of ornamental designs for setting and arranging jewelry. U.S. Des. Pat. No. 335,471, issued to Coleman on May 11, 1993; U.S. Des. Pat. No. 386,443, issued to Itzkowitz on Nov. 18, 1997; U.S. Des. Pat. No. 387,300, issued to Morrison on Dec. 9, 1997; U.S. Des. Pat. 390,151, issued to Blum et al. on Feb. 3, 1998; U.S. Des. Pat. No. 409,518, issued to Ho on May 11, 1999; U.S. Des. Pat. No. 430,061, issued to Chan on Aug. 29, 2000; U.S. Des. Pat. No. 462,289, issued to Wolf on Sep. 3, 2002; U.S. Des. Pat. No. 483,687, issued to Chan on Dec. 16, 2003; U.S. Des. Pat. No. 485,509, issued to Shagalov on Jan. 20, 2004; U.S. Pat. No. 5,099,660, issued to Dostourian on Mar. 31, 1992 (gem setting that uses large and small stones to hold gems and thereby eliminating the need to use prongs); U.S. Pat. No. 6,591,633, issued to Pachauer on Jul. 15, 2003; U.S. Patent Publication Number 2002/0112505, published on Aug. 22, 2002; U.S. Patent Publication Number 2003/0046955, published on Mar. 13, 2003 (jewelry arrangement using prongs to hold gemstones); U.S. Pat. No. 1,238,721, issued to Birnbaum et al. on Aug. 28, 1917; and U.S. Pat. No. 2,080,317, issued to Jaeckel on May 11, 1937 all show ornamental designs of settings or arrangements of jewelry.

Other methods for ornamenting and decorating jewelry or other articles are disclosed in U.S. Pat. No. 1,737,333, issued to Rivelis on Nov. 26, 1929, (method of making steel ornaments); U.S. Pat. No. 3,762,883, issued to Shepard et al. on Oct. 2, 1973 (discloses a steel substrate coated with gold or copper or brass which is then coated with zinc); U.S. Pat. No. 6,146,723, issued to Arends on Nov. 14, 2000 (a method of enhancing the appearance of a gem stone which uses colored transparent alcohol based ink to coat the substrate of the stone); U.S. Des. Pat. No. 434,995, issued to Harkness on Dec. 12, 2000 (a ring); U.S. Des. Pat. No. 440,179, issued to Morelle on Apr. 10, 2001 (a ring); U.S. Design Pat. No. 401,884, issued to Gruosi on Dec. 1, 1998 (earrings); and U.S. Design Pat. No. 447,716, issued to Itzknowitz on Sep. 11, 2001 (jewelry).

None of the above inventions and patents, taken either singly or in combination, is seen to describe the instant invention as claimed. Thus, the method for metal ornamentation of the present invention solving the aforementioned problems is desired.

SUMMARY OF THE INVENTION

The present invention uses an engraving technique to make indentations for single and single line granulation patterns prior to applying the granules to the base surface. When the indentations are made in the right size on the base surface, the granules can be placed in the indentations easily and precisely. Singles and single lines of granules will securely remain in the indentation during the granulation process due to the greater binding strength created by the increased contact surface between the granules and the indentation. Without the fear of those technical problems associated with traditional granulation techniques described above, the granulation artist can now design and create granulated patterns as far as the imagination can go.

Since single and single lines of granules can be fixed precisely on a workpiece using this method, gemstone mountings can be created inexpensively by positioning granules on the base surface along the outline of the space for the gemstone, and just simply using granules as a setting device.

The present invention solves the problems of arranging single and single line granulation patterns. The method enables pre-formed granules to be arranged on a metal workpiece in single and single line pattern as the granulation artist desires with precision and establishes a method of setting gemstones within the workpiece. The method places pre-formed spherical granules in seats defined on the base surface of the workpiece. The seats permit single and single lines of granules to stay in a particular position on the workpiece. There is no need to provide seats in the surface of the workpiece for the group of granules because the increased number of contact points for each granule creates a strong bond due the interlocking of surrounding granules.

Since the amount of fusion is increased due to the larger number of contact points created by the seat, single granules are strong enough to surround and support edges of a gemstone, thus saving the time and effort normally required to create or use traditional setting methods, such as prong, bezel or pave settings. Granulation artists can also create very unique geometric granule arrangement patterns using granules combined with gemstones.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a method for metalwork ornamentation. The method includes a method for arranging single and single line granulation patterns. The method also teaches gemstone setting by using granules to retain a gemstone to the jewelry. The granules used in the present invention are round spheres of metal made in a range of sizes. The granules are made prior to carrying out the granulation process using any known method.

Both the workpiece and the granules are made of fusible metal conventionally used in the jewelry art, such as gold, silver, copper, platinum, etc.

Figure 1:
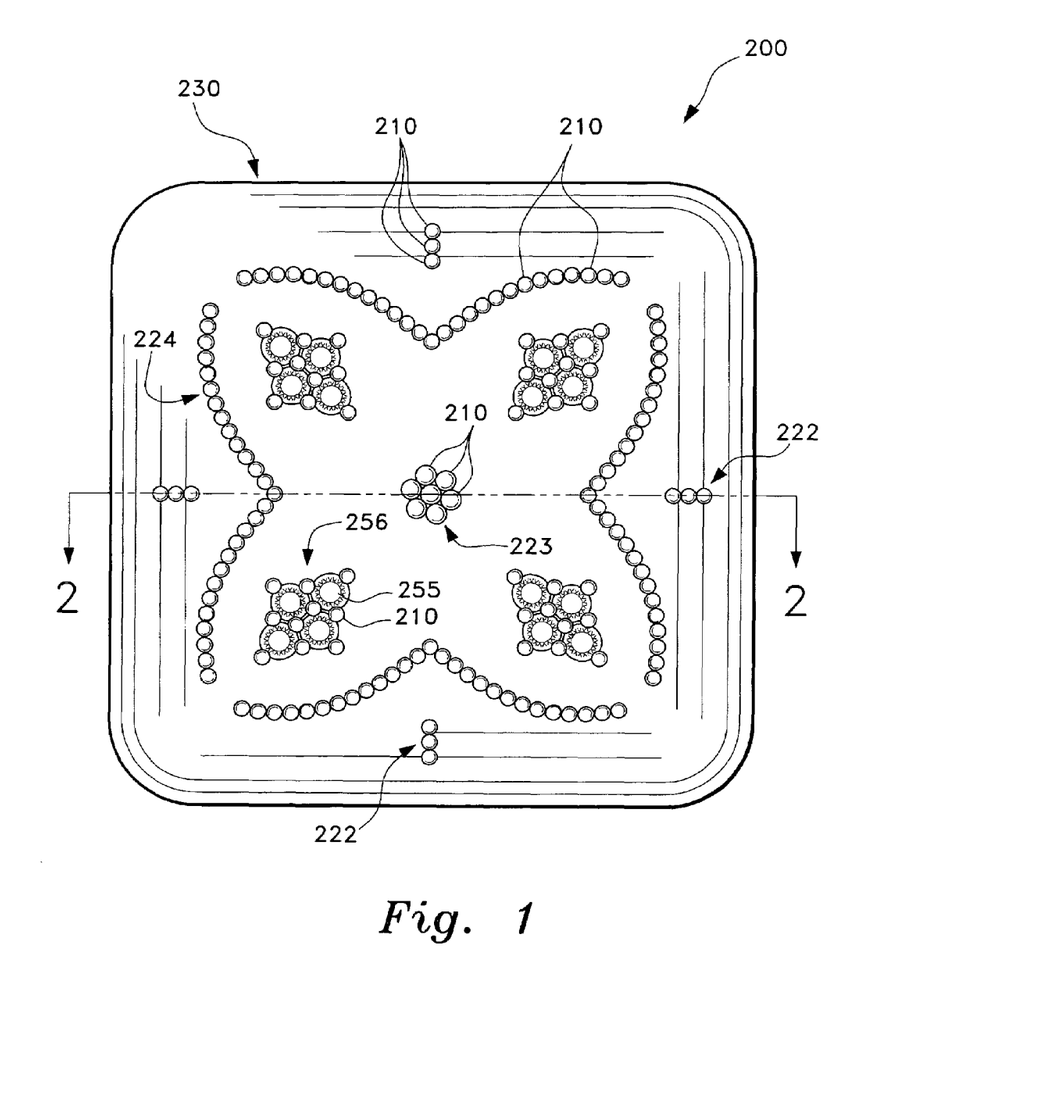
FIG. 1 is a front view of a representative article of jewelry made according to the method for metal ornamentation according to the present invention.
Figure 1A:
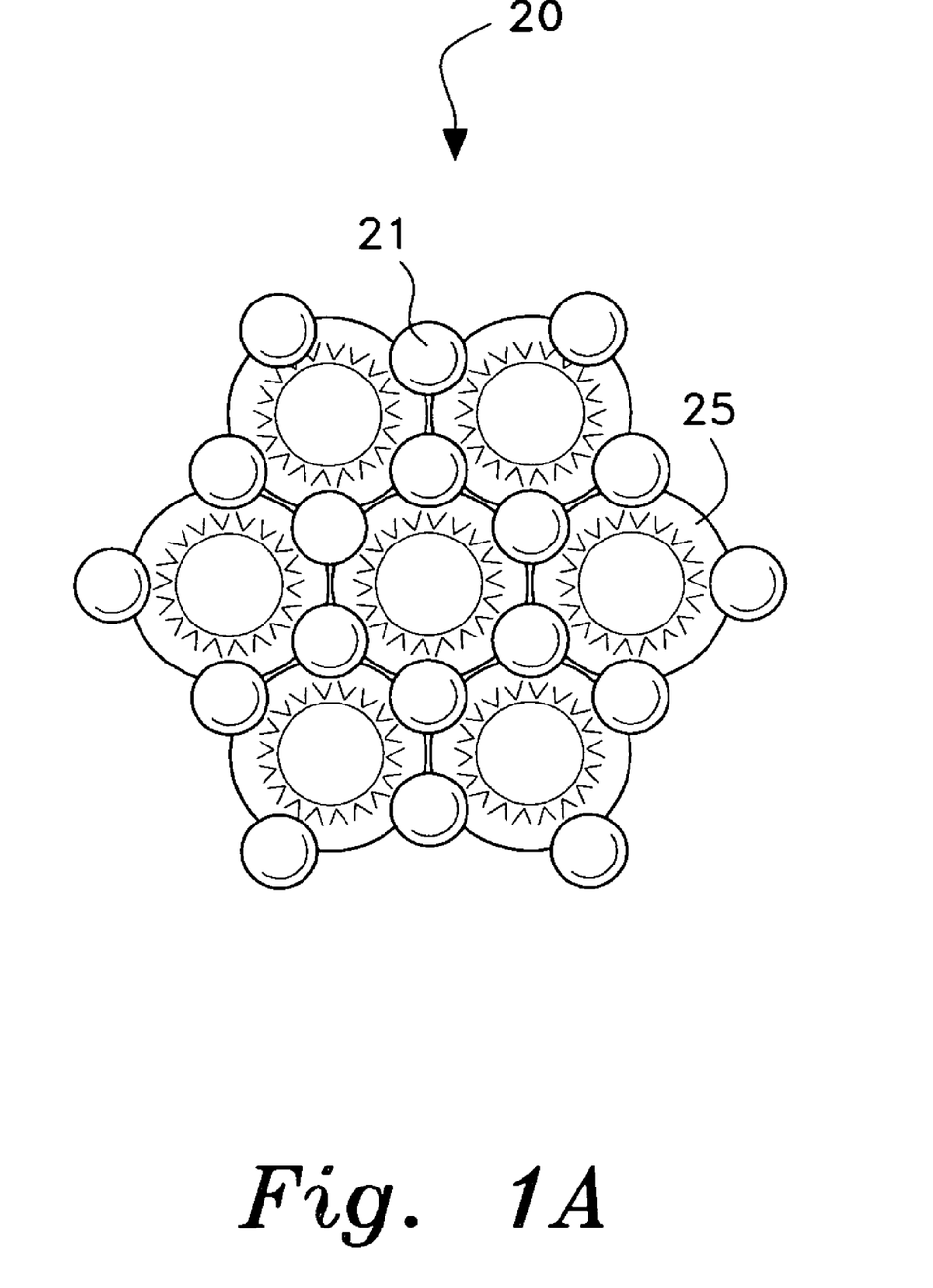
FIGS. 1A, 1B, 1C, 1D and 1E are plan views of gemstone patterns made possible by the method of the present invention.
Figure 1B:
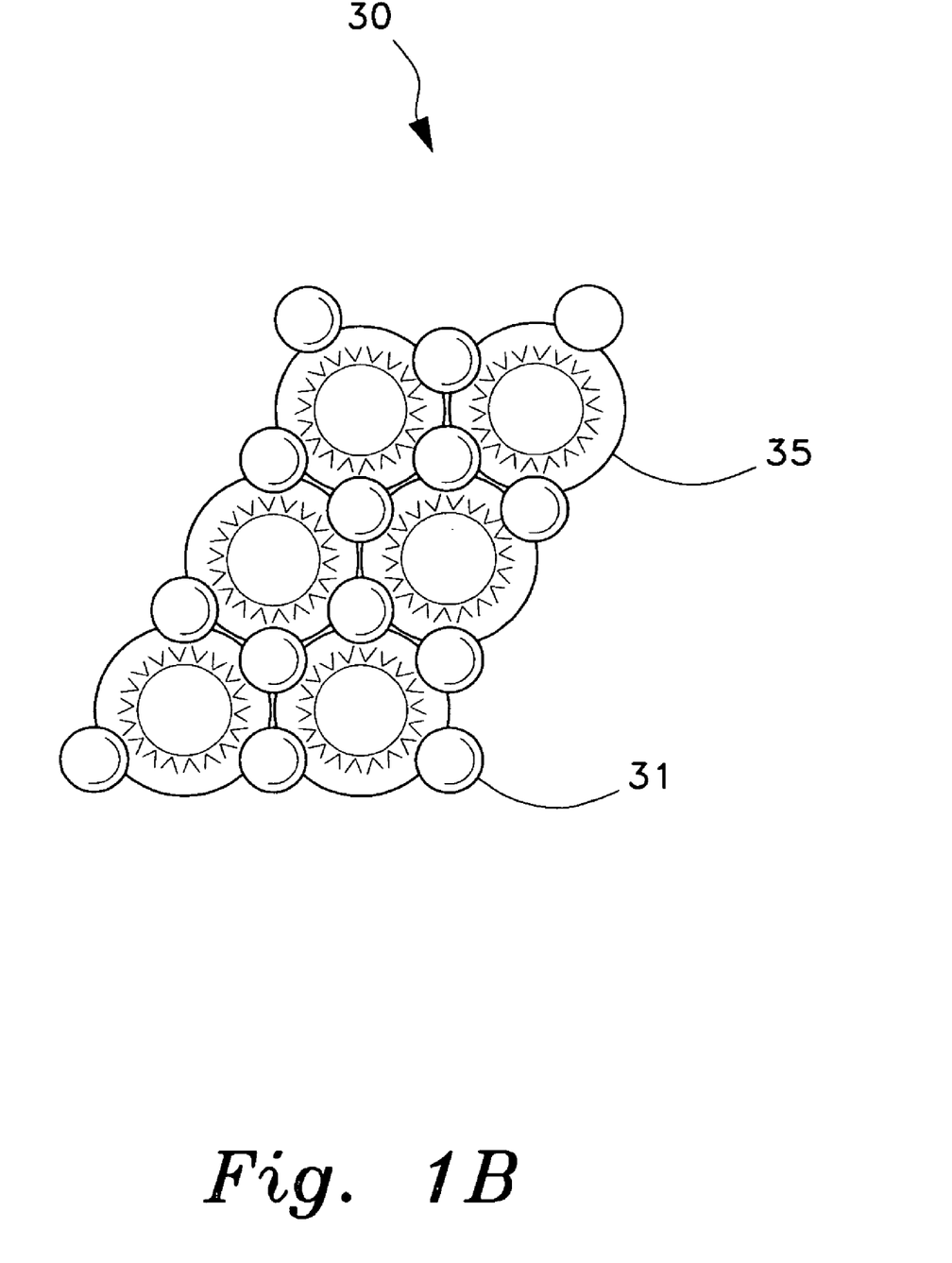
Figure 1C:
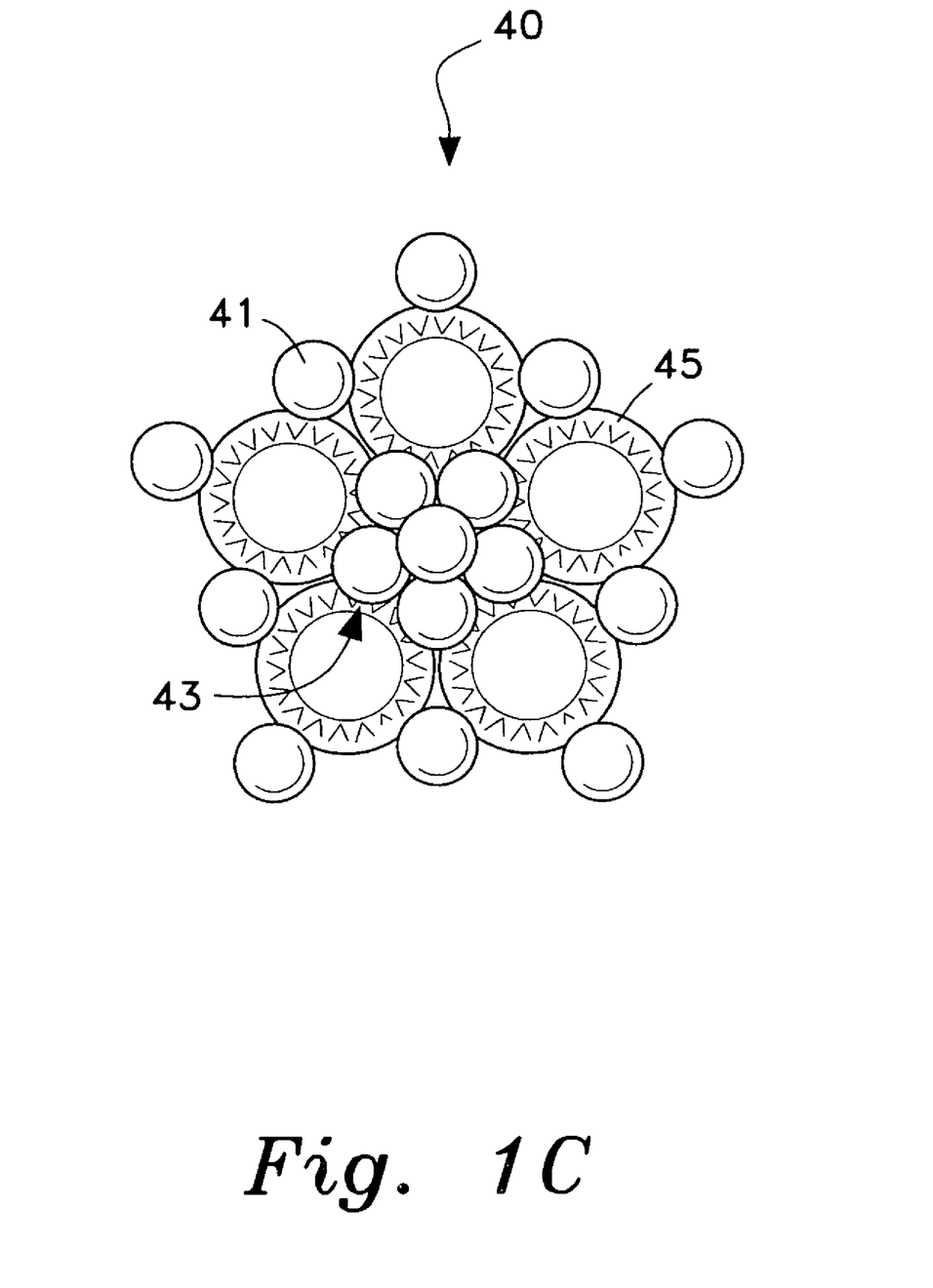
Figure 1D:
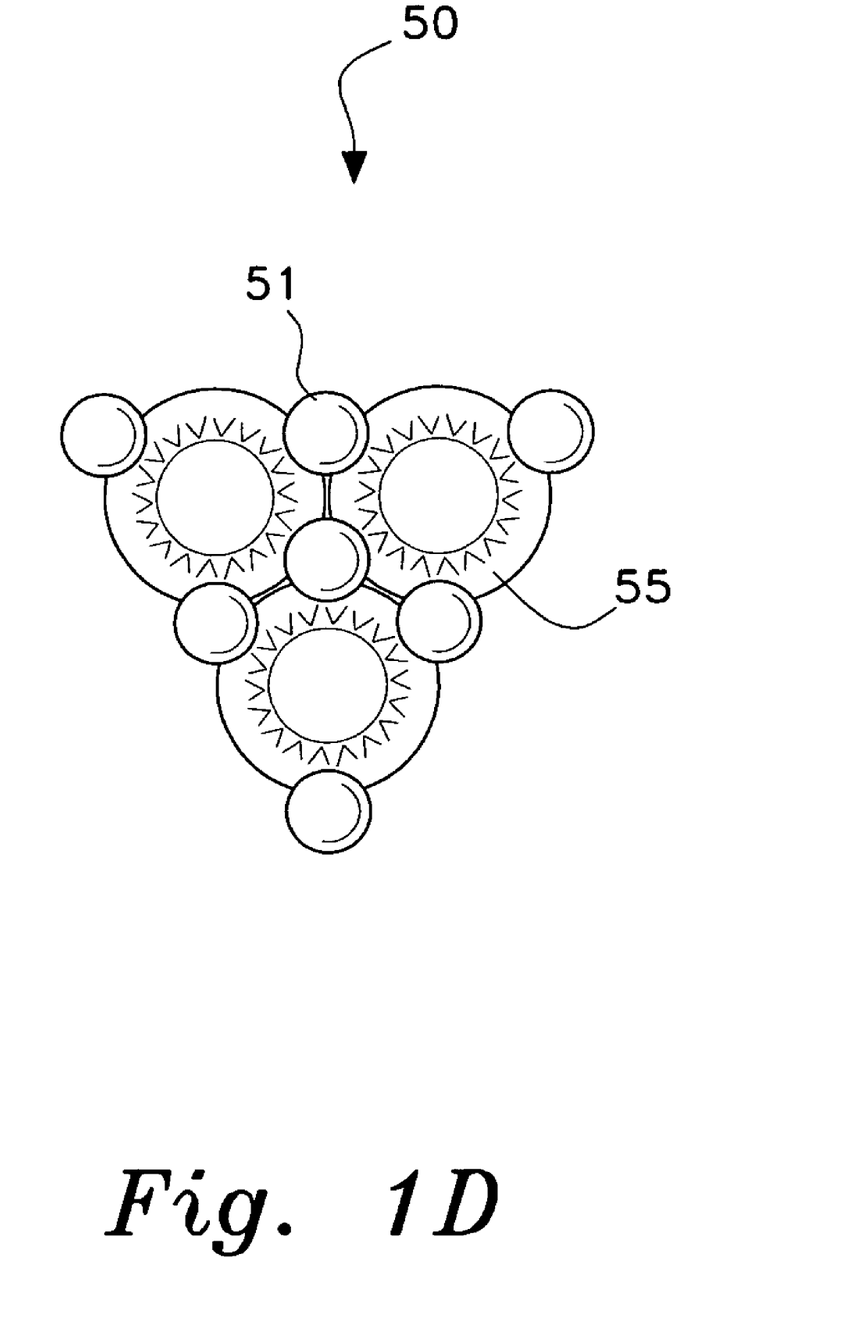
Figure 1E:
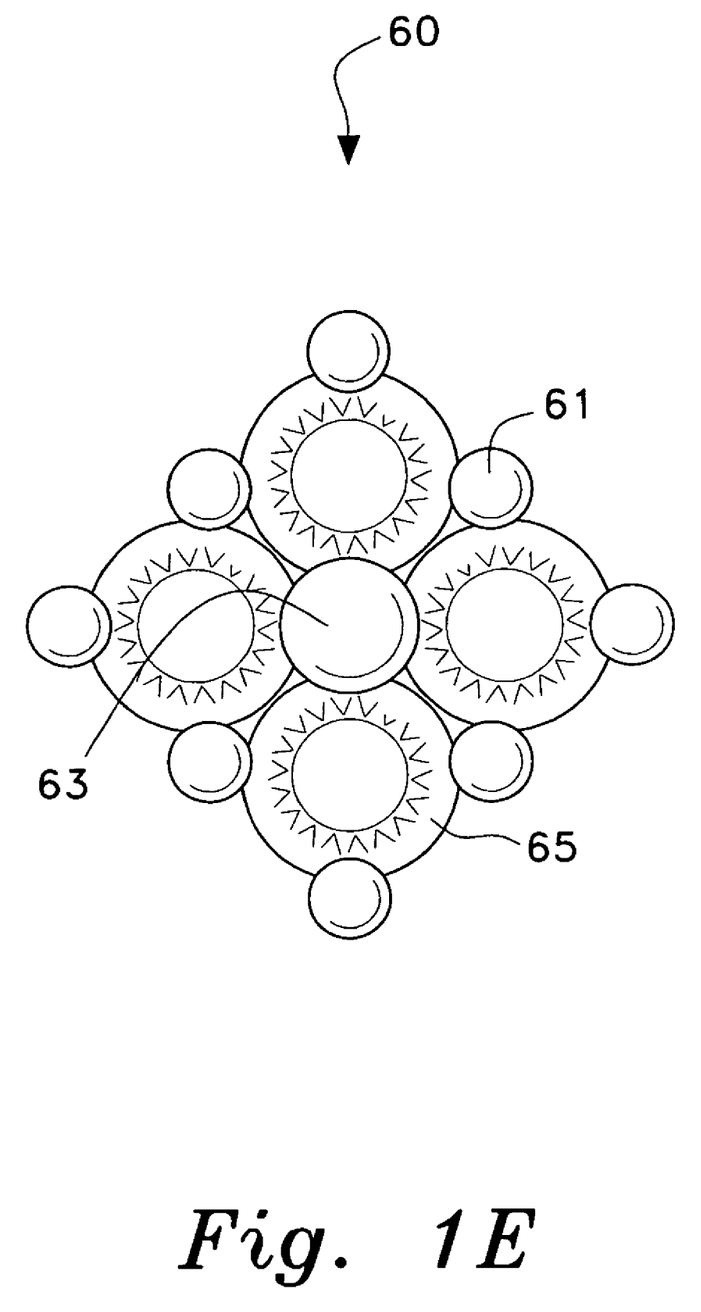
Figure 2:
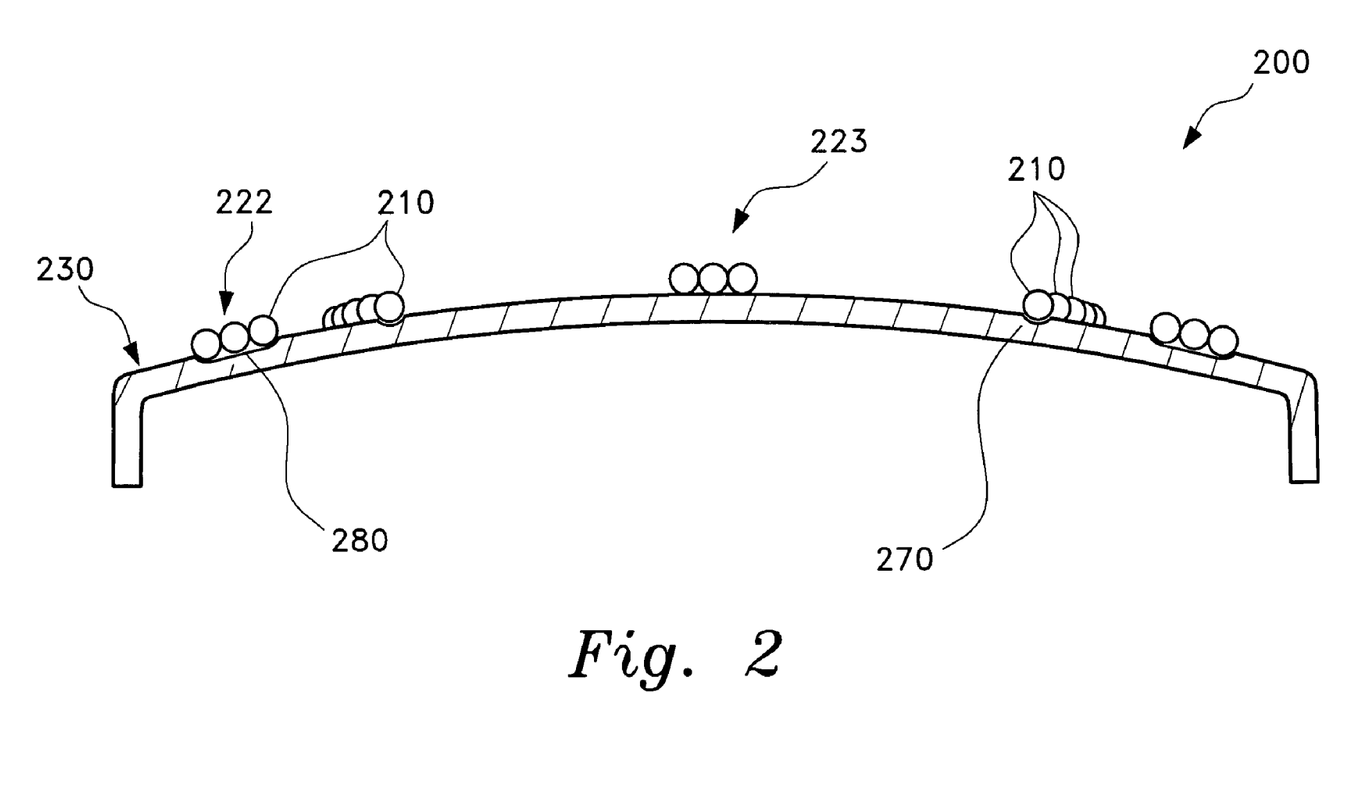
FIG. 2 is a section view drawn along lines 2-2 of FIG. 1.

As shown in FIG. 1, by using the granule-arranging method of the present invention, a granulation artist is able to create an article of granulated jewelry 200 by placing individual granules 210, or several granules, in a variety of patterns without requiring a traditional means of support, such as a wire or a raised edge, without waiting for each granule to dry, and without worrying that a granule will be displaced while fusing. The granulated jewelry 200 displays a unique pattern where the granules 210 are disposed on a surface 230 in a straight row 222, a curved row 224 or in a geometric pattern 256 formed by a group of single granules to surround gemstones 255. Granulation artists can also create other very unique geometric granulation patterns using granules 21, 31, 41, 51, 61, 63 combined with gemstones 25, 35, 45, 55, 65 as shown in FIGS. 1A, 1B, 1C, 1D, and 1E. The unique patterns are achieved by placing the granules 210 in seats created on the surface 230 of the jewelry 200. As shown in FIG. 2, the seats 270, 280 provide a footing and prevent the sphere-shaped granules from rolling around on the surface 230 of the jewelry 200 during the granulation process. Seats 270, 280 also create more contact area with the granules 210 for adhesive to be disposed between granules 210 and the workpiece 200. Due to surface tension, the cluster 223 does not need granule seats to remain on the surface 230.

The seats 270, 280 are depressions impressed into or formed in the mounting surface or base metal surface 230 of jewelry 200 by hand tools or machine tools commonly used in the industry. If the seats 270, 280 are made by hand, a grinding tool, such as a bur tool or an engraving tool, may be employed. The bur tool's functional tip ideally should be spherically shaped. The engraving tool's tip ideally should be half round. If the seats 270, 280 are made by machine, a computerized engraving machine may be employed that utilizes either a cutting tool or a laser beam. Alternatively, a skilled user may use an electric tacking machine to attach granules in place without making seats, but the tacking process is very time consuming.

Preferably, the seats 270, 280 should be the same ratio, or close to the same ratio, as the granules 210 that are intended to rest in the seats 270, 280. The seats 270, 280 can be of any depth that would be sufficient for holding the granules 210 and adhesive material. Preferably the seats 270, 280 for decorative granules will have a depth of about 5% or more of the size of the granules 210. The seats for granules functioning as a setting device will have a deeper depth, about 10% or more of the size of the granules, in order to provide a larger fusion area, so that the granules will be strong enough to secure the gemstone. Otherwise, repeating the heating process is necessary until the right size of fusion fillet is achieved. Seats 270,280 therefore allow individual granules 210 to be placed freely on the mounting surface of jewelry 200, thereby reducing the likelihood of granules 210 being dislocated from the jewelry 200 and providing more contact surface area for more surface tension. Cluster 223 does not require seats. The cluster patterns remain securely in position on the base surface throughout the process of granule arranging because of stronger bonding strength created by the increased number of contact points for each granule when the granules interlock with surrounding granules.

Figure 3:
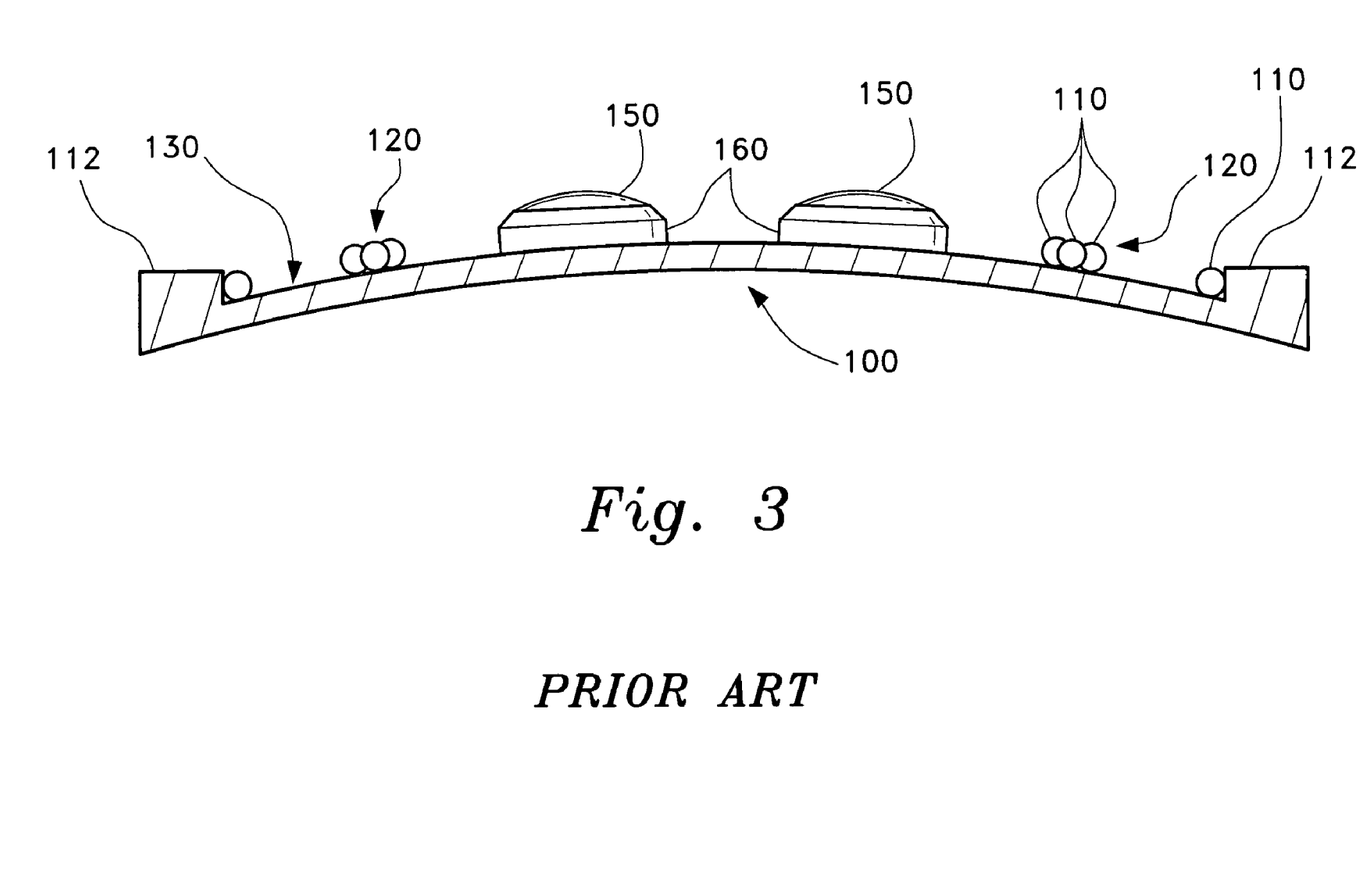
FIG. 3 is a section view of an article of jewelry made according to the prior art without using the present method.

The seats 270, 280 of the present method reduce the inherent difficulties associated with using sphere-shaped granules to create single and single line granule arrangement patterns. When making granulated jewelry by traditional methods, more time and effort are required to arrange single granule and single lines of granules due to the natural fact that granules tend to attract each other to form clusters. Therefore, the single granules and single rows of granules are usually supported by a wire, an edge, a border, or otherwise need to stay along some object to increase the surface tension of the glue solution to achieve precision and stability. As shown in FIG. 3, when using the conventional method of making granulated jewelry, individual granules 110 are placed on a mounting surface 130 of a jewelry article 100 in clusters 120 or along an edge 112 in order to maintain some sort of stability on the mounting surface 130. Jewelry 100 has gemstones 150 that are disposed on the surface 130, the gemstones 150, being retained on the surface 130 using a traditional setting, such as a bezel setting 160.

Figure 4:
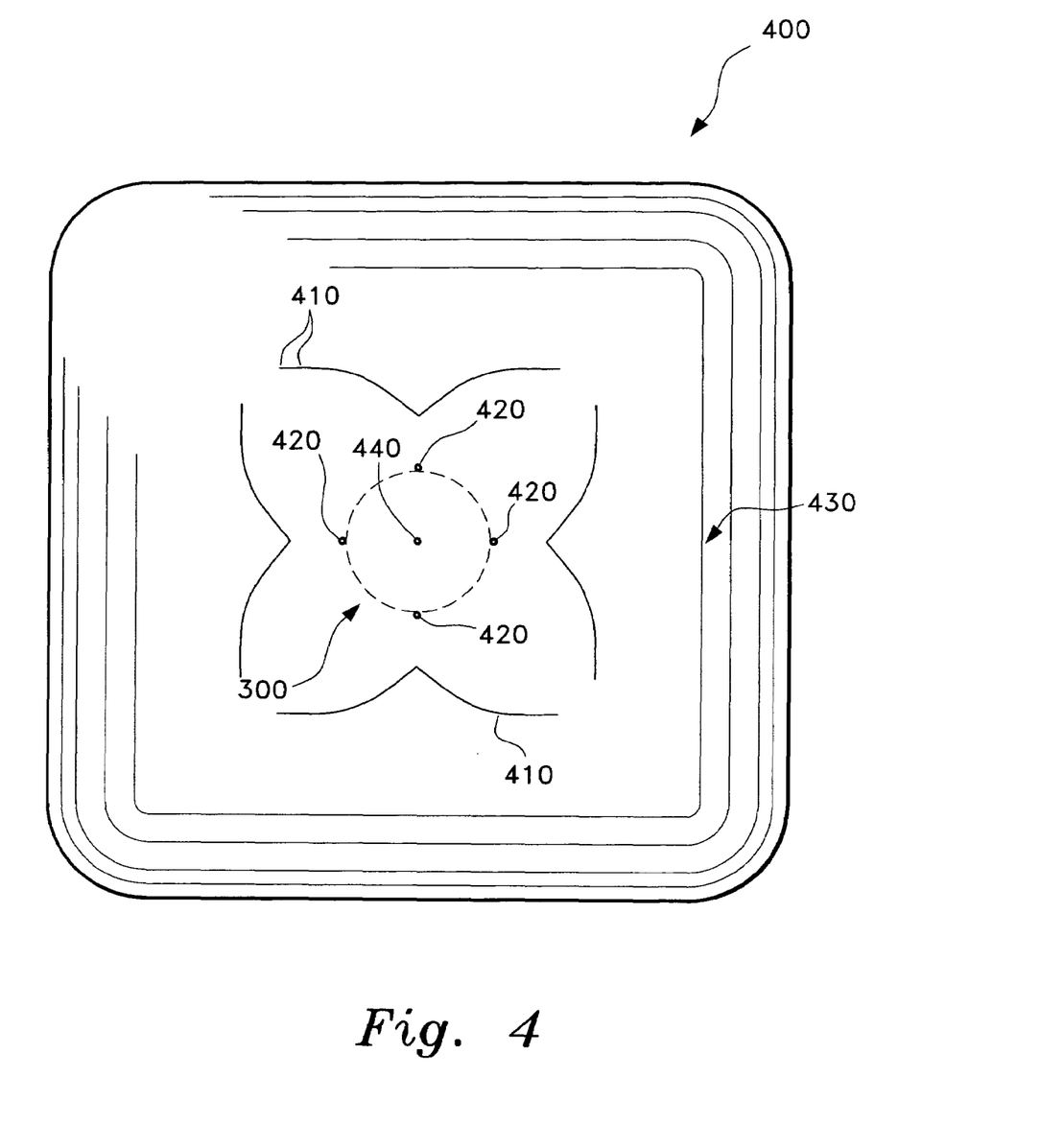
FIG. 4 is a front view of a base surface for an article of jewelry after having marks disposed on the surface of the article and around the space for the gem according to the method of the present invention.

The present method of granulation can use the pre-formed granules to set a gemstone, as illustrated in FIGS. 4 through 6C. Referring first to FIG. 4, a gemstone space 300 is marked on the mounting surface 430 of the jewelry 400, which may be a ring blank, pendant, earring, or other workpiece. Once a design is created and transferred onto the surface 430 of the workpiece 400, the space 300 for a gemstone is marked using a marking tool, such as a pair of compus, a center punch, a scriber tool, a small round bur, or any other appropriate tool. The marking tool makes marks 410, 420, and 440 on the surface 430 of the workpiece 400. Marks 410 form a design intended to decorate the surface 430. Marks 420 are made around the space 300 for the gemstone to indicate where to bore granule setting seats. Mark 440 is made within the center of the gemstone space 300 and indicates the centermost point on the gemstone.

Figure 5A:
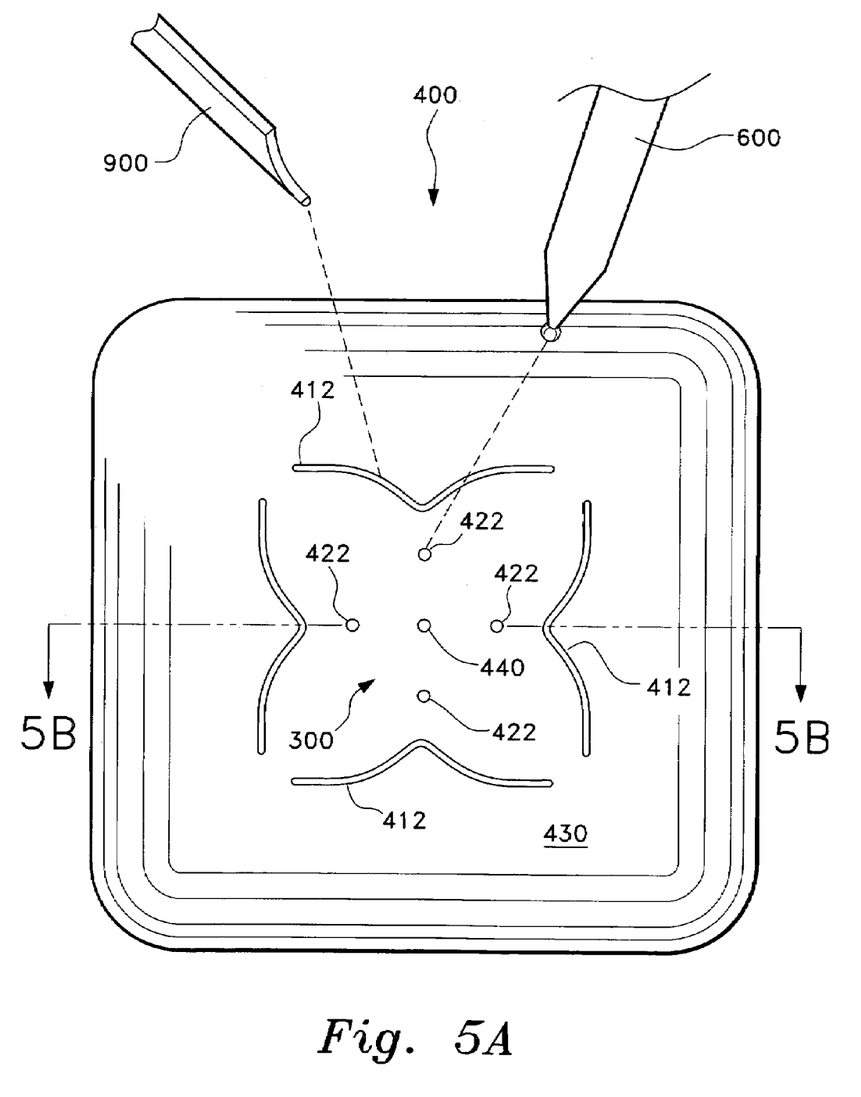
FIG. 5A is a front view of the base surface of FIG. 4 showing seats being bored at each marking according to the method of the present invention.
Figure 5B:
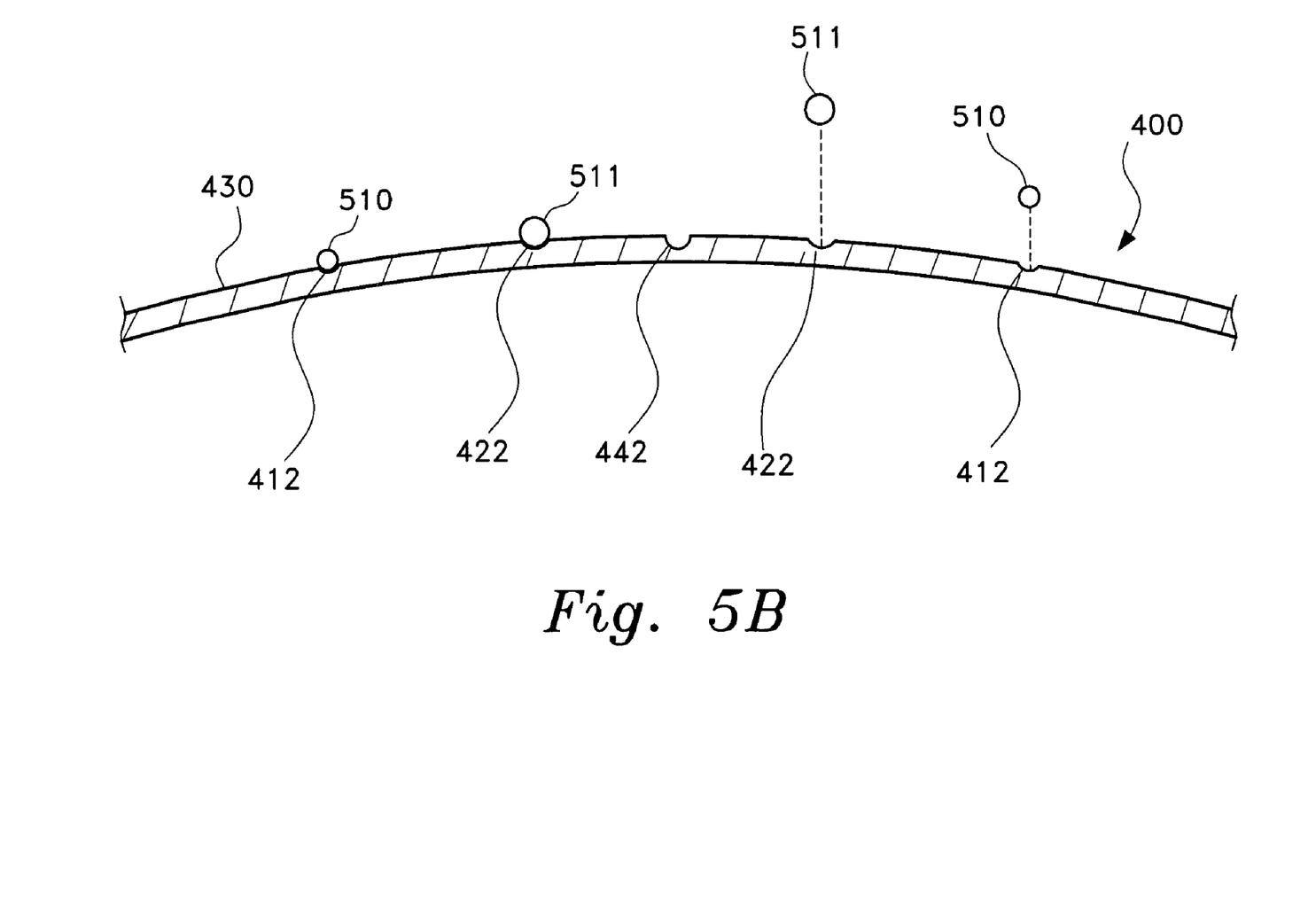
FIG. 5B is a section view drawn along lines 5B-5B of FIG. 5A.

Next, channels 412 and seats 422 and 442 are bored into the surface 430 of the workpiece 400 using a bur tool 600, as illustrated in FIGS. 5A and 5B. As illustrated in FIG. 5A, channel 412 is made by using an engraving tool 900 over marks 410 and represents the design intended to embellish the workpiece 400. Seats 422 are granule setting seats. The granule setting seats 422 are placed around the site marked to place the gemstone and will ultimately hold granules 511 that will be used to set the gemstone. Seat 442 will not hold granules, but instead marks where a hole should be drilled in order to create an opening to receive the gemstone.

Once the channels 412 and seats 422, 442 are bored, the surface 430 is cleaned in preparation for receiving the pre-formed granules 510, 511. After the granules 510, 511 are placed on the surface 430, the granules 510, 511 are placed into the channels 412 and seats 422, respectively, and held in place with the help of adhesive. The type of adhesive used may be a hide glue solution composed of differing portions of hide glue, water, and soldering flux. Individual jewelers will have their own preferred composition for the solution. An exemplary adhesive contains one part hide glue, six parts water, and one to two parts flux. The adhesive placed in the channels 412 and seats 422 retains the individual granules 510, 511 on the surface 430 of the jewelry 400 until the adhesive has dried.

When the adhesive is dry, the pre-formed granules 510, 511 will be permanently joined to the workpiece 400 by fusing or by soldering. Granules used for setting gemstones may be arranged and fused to the base metal prior to the other decorative granules to ensure that they have enough binding to be used as setting devices. Fusing is more efficient than soldering. Granules 510 are smaller than granules 511; granules 510 are decorative granules while granules 511 are gemstone-setting granules.

If soldering is used to join the granules 510, 511 to the workpiece 400, then solder must be placed in and along the channels 412 and seats 422 and the granules 510, 511 must be placed on top of the solder. The workpiece 400 is then heated until the solder binds the granules 510, 511 to the workpiece 400. The right amount of the solder used is very important, so enough solder only melts around the contact point of granule and base metal. Soldering is not recommended because solder usually occupies too much space. The appearance of true granulation of granules simply sitting on the base surface cannot be achieved by soldering.

After the granules 510, 511 are permanently joined to the jewelry 400, a gemstone seat is created. The gemstone seat is bored into the surface 430, preferably using a bur tool having a cutting tip matching the size and shape of the gemstone that will be joined to the jewelry 400. The granules 610 form the clusters that are secured to the jewelry surface 400 without the need for granule seats.

The gemstone seat is created using the traditional method by drilling or cutting into the surface 430 and cutting into portions of the granules 511 disposed in seats 422. The granules 511 are disposed in the granule setting seats 422. These granules 511 serve as the setting device to hold the gemstone in the completed jewelry article 400. The gemstone seat should be created subsequent to the granules 511 being permanently joined to the workpiece 400. After the gemstone seat is created, the gemstone is placed within the gemstone seat and the granules 511 disposed in the seats 422 are pushed over the gemstone, as shown in FIG. 6C, using a beading tool 800 or some other tool.

Figure 6A:
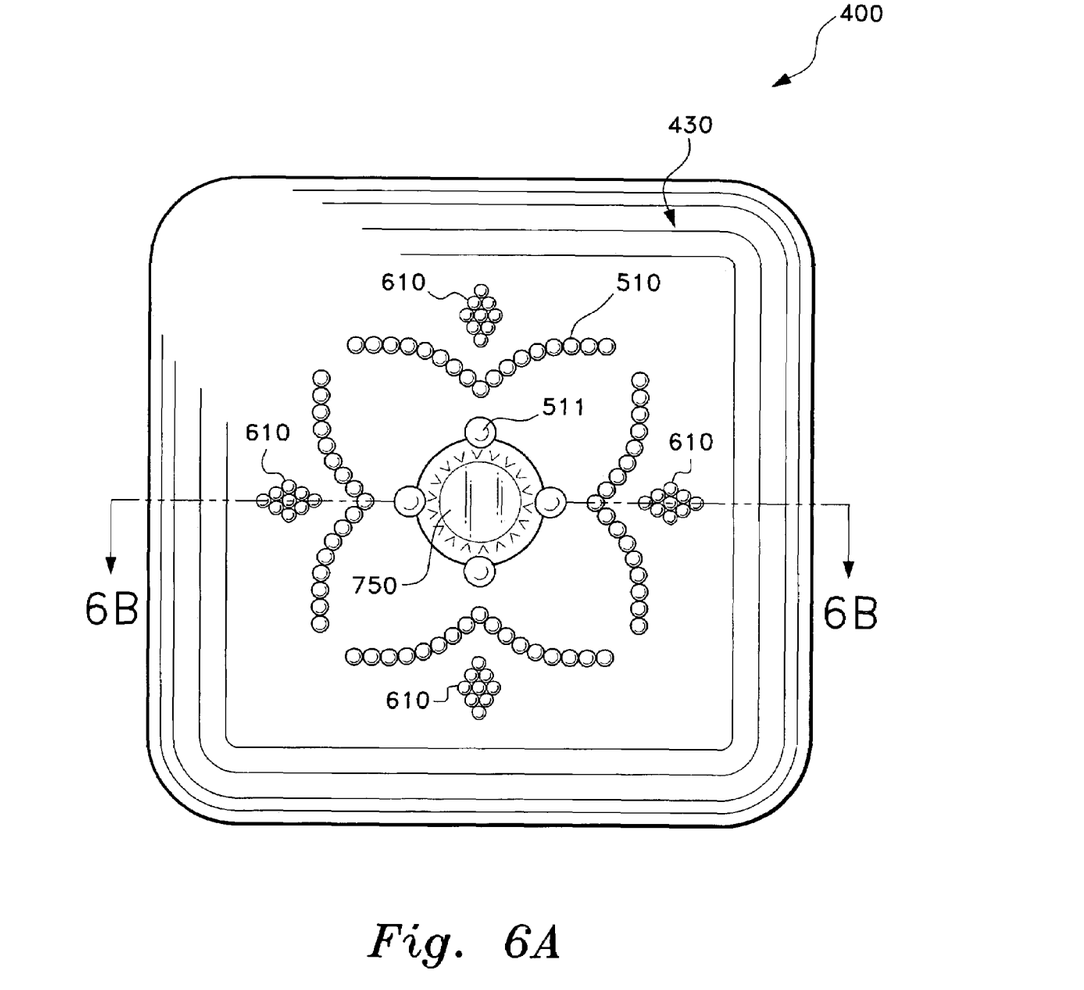
FIG. 6A is a front view of the completed jewelry article after following the steps illustrated in FIGS. 4-5B according to the method of the present invention.
Figure 6B:
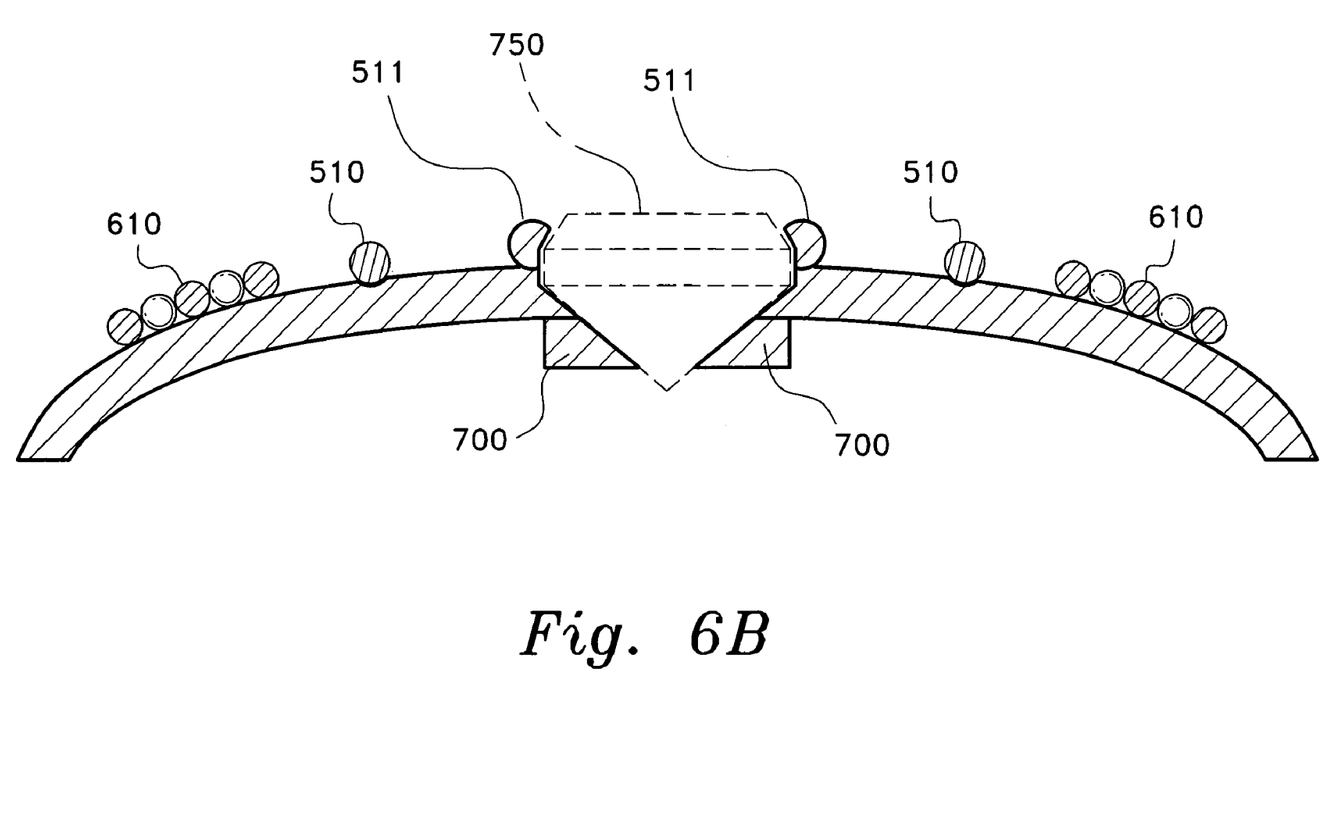
FIG. 6B is a section view drawn along lines 6B-6B of FIG. 6A.
Figure 6C:
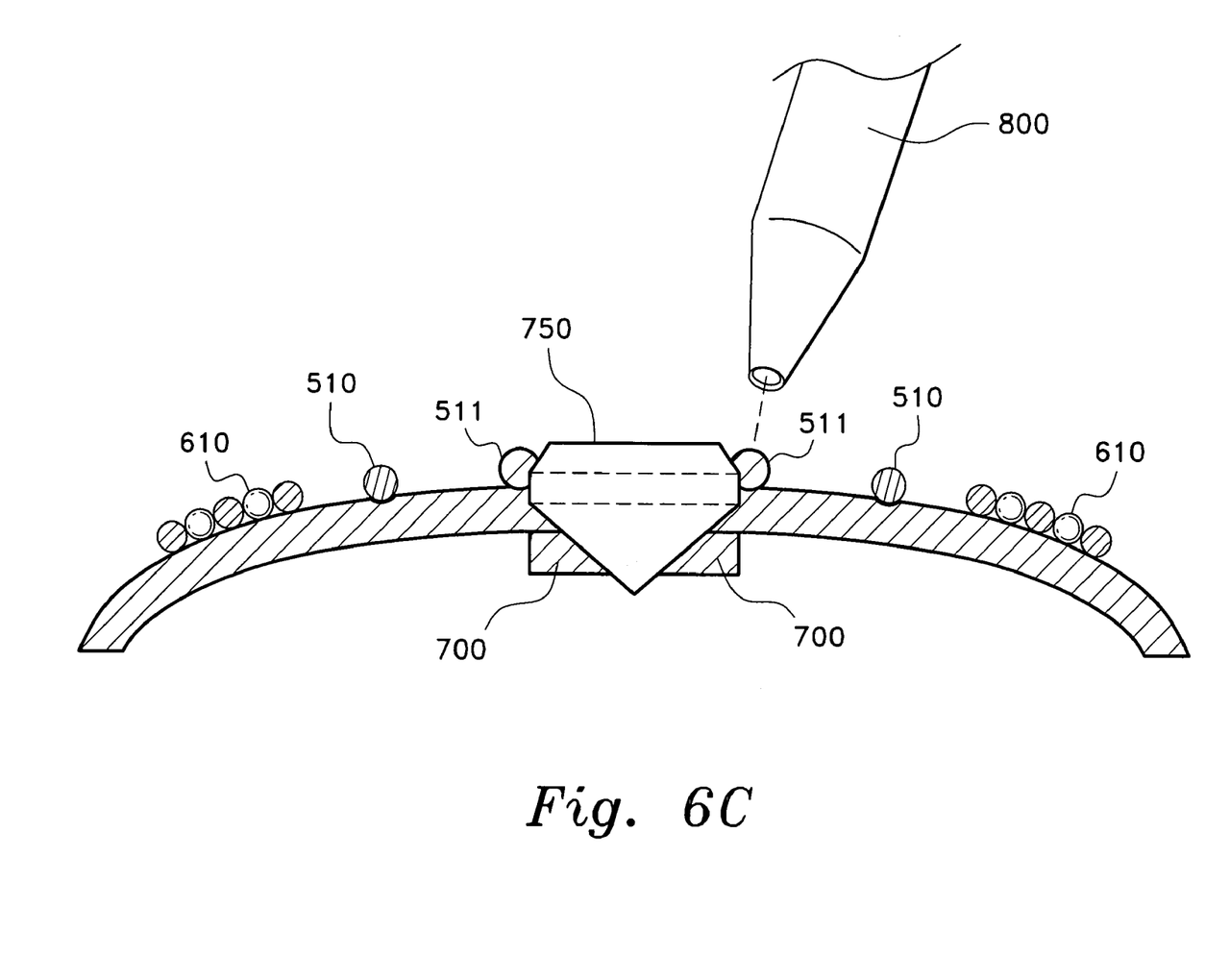
FIG. 6C is a section view of the completed jewelry article made according to the method of the present invention.

Referring to FIG. 6A, the present method for setting gemstones can be used to set a variety of stones, such as faceted stones or cabochon stones in any size and any shape. Faceted stones with a heavy girdle and cabochon stones are characterized by being raised above the mounting surface somewhat higher than regular faceted stones, and therefore require more than one layer of granules to set the stones. Layered granules or larger than normal granules can be used to set these stones. A wooden bezel pusher will be needed when pushing the layered granules over the stone. Referring to FIG. 6B, gemstones 750 having a heavy girdle and cabochon stones may require the underside of the mounting area to be fused or soldered. Extra layers of metal 700 are provided so that the seats for gemstones 750 are extended downward. It will be understood that the extra layers of metal 700 shown in FIG. 6B are only optionally provided for large gemstones; smaller gemstones do not require the extra layers of metal 700.

It is to be understood that the present invention is not limited to the embodiments described above, but encompasses any and all embodiments within the scope of the following claims.

I claim:

1. A method of making granulated jewelry including a gemstone, comprising the steps of:
   providing an article of jewelry;
   marking a gemstone space on a mounting surface of an article of jewelry;
   marking a granule arrangement pattern on the mounting surface of an article of jewelry, said pattern being selected from the group consisting of singles and single lines;
   creating a plurality of granule seats to outline the space for the gemstone, said granule seats having a depth of about 10% of the size of the granule adapted to be seated therein;
   creating a plurality of granule seats for said singles and single lines wherein said seats are selected from the group consisting of indentations and channels, said granule seats having a depth of about 5% of the size of the granule adapted to be seated therein;
   providing granules corresponding to each of the plurality of granule seats;
   applying adhesive to the granules and the granule seats;
   placing granules in the granule seats;
   joining the granules to the mounting surface of the jewelry;
   forming a gemstone seat on the surface of the jewelry, the gemstone seat being disposed between the granules disposed in the granule seats outlining the gemstone;
   undercutting below the granules disposed within the granule seats outlining the gemstone;
   placing the gemstone in the gemstone seat; and
   pushing the granules disposed in the granule seats over the gemstone;
   whereby the gemstone is set on the mounting surface of the jewelry and held in place by the granules disposed in the granule seats outlining said gemstone.

2. The method of making granulated jewelry according to claim 1, wherein the step of joining the granules to the mounting surface includes fusion welding.

3. The method of making granulated jewelry according to claim 1, wherein the step of forming the gemstone seat includes boring into the mounting surface.

4. The method of making granulated jewelry according to claim 1, further comprising the step of applying and securing clusters of interlocked granules on the mounting surface of an article of jewelry.

* * * * *